United States Patent
Lee et al.

(10) Patent No.: US 12,128,350 B2
(45) Date of Patent: Oct. 29, 2024

(54) WATER-LEAN CARBON DIOXIDE ABSORBENT AND METHOD FOR CAPTURING CARBON DIOXIDE BY USING SAME

(71) Applicant: CE-TEK CO., LTD., Daejeon (KR)

(72) Inventors: Yun-Je Lee, Daejeon (KR); Hai Lian Jin, Daejeon (KR); Seong Yeon Kim, Daejeon (KR); Ye Sol Woo, Daejeon (KR); Kwang Soon Lee, Seoul (KR); Hoon Sik Kim, Seoul (KR)

(73) Assignee: CE-TEK CO., LTD., Daejeon (KR)

( * ) Notice: Subject to any disclaimer, the term of this patent is extended or adjusted under 35 U.S.C. 154(b) by 0 days.

(21) Appl. No.: 18/268,488

(22) PCT Filed: Aug. 18, 2022

(86) PCT No.: PCT/KR2022/012354
§ 371 (c)(1),
(2) Date: Jun. 20, 2023

(87) PCT Pub. No.: WO2023/068516
PCT Pub. Date: Apr. 27, 2023

(65) Prior Publication Data
US 2024/0042376 A1    Feb. 8, 2024

(30) Foreign Application Priority Data
Oct. 20, 2021   (KR) .................. 10-2021-0140281

(51) Int. Cl.
*B01D 53/14*   (2006.01)
*B01D 53/62*   (2006.01)
*B01D 53/78*   (2006.01)
*B01D 53/96*   (2006.01)

(52) U.S. Cl.
CPC ..... *B01D 53/1493* (2013.01); *B01D 53/1425* (2013.01); *B01D 53/1475* (2013.01);
(Continued)

(58) Field of Classification Search
CPC ........... B01D 53/62; B01D 2252/2026; B01D 2252/20421; B01D 2252/20431;
(Continued)

(56) References Cited

U.S. PATENT DOCUMENTS

| 10,099,172 B2 | 10/2018 | Hong et al. |
| 2012/0051989 A1 | 3/2012 | Wagner et al. |

(Continued)

FOREIGN PATENT DOCUMENTS

| KR | 10-2009-0030266 A | 3/2009 |
| KR | 10-1506332 B1 | 3/2015 |

(Continued)

OTHER PUBLICATIONS

Korean Notice of Opinion issued on Apr. 7, 2022 in corresponding Korean Patent Application No. 10-2021-0140281 (11 pages in English and.

(Continued)

*Primary Examiner* — Anita Nassiri-Motlagh
(74) *Attorney, Agent, or Firm* — NSIP Law (57) ABSTRACT

A water-lean carbon dioxide absorbent according to the present invention comprises a cyclodiamine and a polyalkylene glycol alkyl ether and further comprises an alkanolamine, wherein the absorbent shows an excellent reaction rate with carbon dioxide, is resistant to degradation due to oxygen and heat, and can greatly reduce energy consumption due to latent heat of water when regenerated, and thus leads to a water-lean carbon dioxide absorbent with improved regeneration efficiency.

3 Claims, 5 Drawing Sheets

(52) U.S. Cl.
    CPC .............. *B01D 53/62* (2013.01); *B01D 53/78* (2013.01); *B01D 53/96* (2013.01); *B01D 2252/2026* (2013.01); *B01D 2252/20421* (2013.01); *B01D 2252/20431* (2013.01); *B01D 2252/20447* (2013.01); *B01D 2252/20484* (2013.01); *B01D 2252/20489* (2013.01); *B01D 2252/504* (2013.01); *B01D 2257/504* (2013.01)

(58) Field of Classification Search
    CPC ........... B01D 2252/20447; B01D 2252/20484; B01D 2252/20489; B01D 2252/504; B01D 2257/504
    USPC ......................................................... 423/229
    See application file for complete search history.

(56) References Cited

U.S. PATENT DOCUMENTS

| | | |
|---|---|---|
| 2013/0175471 A1 | 7/2013 | Wagner et al. |
| 2013/0244312 A1* | 9/2013 | Larkin ............... B01D 53/1493 435/283.1 |
| 2015/0367277 A1 | 12/2015 | Kim et al. |
| 2017/0225118 A1 | 8/2017 | Kim et al. |
| 2017/0246587 A1 | 8/2017 | Hong et al. |
| 2018/0272270 A1 | 9/2018 | Ingram et al. |

FOREIGN PATENT DOCUMENTS

| | | | |
|---|---|---|---|
| KR | 10-1549950 B1 | 9/2015 | |
| KR | 10-1588244 B1 | 1/2016 | |
| KR | 10-2018-0059783 A | 6/2018 | |
| KR | 10-2433565 | 8/2022 | |
| WO | WO-2018164704 A1 * | 9/2018 | ............. B01D 53/14 |
| WO | WO-2021119058 A1 * | 6/2021 | ......... B01D 53/1475 |

OTHER PUBLICATIONS

Korean Notice of Decision of Granting Patent on Aug. 11, 2022 in corresponding Korean Patent Application No. 10-2021-0140281 (2 pages in English and 6 pages in Korean).

* cited by examiner

WATER-LEAN CARBON DIOXIDE ABSORBENT AND METHOD FOR CAPTURING CARBON DIOXIDE BY USING SAME

CROSS REFERENCE TO RELATED APPLICATIONS

This application is a U.S. National Stage Application of International Application No. PCT/KR2022/012354, filed on Aug. 18, 2022, which claims the benefit under 35 USC 119 (a) and 365 (b) of Korean Patent Application No. 10-2021-0140281, filed on Oct. 20, 2021, in the Korean Intellectual Property Office, the entire disclosure of which is incorporated herein by reference for all purposes.

TECHNICAL FIELD

The present invention relates to a carbon dioxide absorbent and a method for capturing carbon dioxide using the same, and more specifically, to a water-lean absorbent that reduces corrosion and regeneration energy of the absorbent, and also relates to an absorbent for preventing solidification of cyclodiamine, which is the main component of the absorbent, at room temperature and a capturing method using the same.

BACKGROUND ART

Fossil fuels are the most widely used energy sources in modern society. Fossil fuels account for a large portion of energy supply, and carbon dioxide emissions are increasing worldwide due to the use of fossil fuels. In particular, with the increasing severity of global warming and extreme weather events, various countries around the world have declared to achieve carbon neutrality in an effort to respond to climate change, and are actively promoting the development of technology for reducing carbon dioxide, which is a major culprit of global warming, and the development of related industries. As carbon emission reduction has emerged as an issue in almost all industrial fields such as electricity generation, steel, cement, and petrochemicals in the carbon-neural era, the technology of capturing carbon dioxide emitted from large-scale emission sources is being emphasized as a key technology for realizing carbon neutrality and demand for such technology and the need for its development are increasing. The International Energy Agency (IEA) has established a strategy to reduce carbon dioxide emissions through the Blue Map Scenario in 2050 in order to reduce carbon dioxide emissions, which is the primary greenhouse gas that causes global warming. The IEA's carbon dioxide emissions target for 2050 is half of the current carbon dioxide emissions, and the carbon dioxide capture and storage (CCS) technology accounts for approximately 20% of the carbon dioxide reduction strategy.

The carbon dioxide capture technologies are largely classified into post-combustion capture, pre-combustion capture, and oxy-fuel combustion. A technology of capturing carbon dioxide emitted from thermal power stations, which is the largest emission source, corresponds to the post-combustion capture technology. The post-combustion capture technology may include a wet-type absorption method, a dry-type absorption method, an adsorption method, a membrane separation method, a cryogenic method, and the like, and currently, the wet-type absorption method is closest to practical use. The wet-type absorption method may be classified into a physical absorption method in which a target gas is physically dissolved in a liquid absorbent and a chemical absorption method in which absorption occurs by a chemical reaction between a solute component of an absorbent and a gaseous component. In the case where the concentration of carbon dioxide is high, such as in natural gas, the physical absorption method using an organic solvent is suitable, and in the case where the concentration of carbon dioxide is low, such as in combustion exhaust gas, the chemical absorption method using amine-based aqueous solution is more effective to use.

Research on carbon dioxide capture technologies is conducted largely through the development of new absorbents and the development of new processes. In the development of new absorbents, research is underway on water-type absorbents that use mixed absorbents of known amines (e.g., MEA, MDEA, DEA, PZ, AMP, etc.) or non-aqueous absorbents that do not use water.

As amine-based chemical absorbents, monoethanolamine (MEA), diethanolamine (DEA), methyl diethanolamine (MDEA), piperazine (PZ), 2-amino-2-methyl-1-propanol (Aminomethyl propanol, AMP), and the like have been studied the most. Monoethanolamine (MEA), which is a primary amine, shows the fastest reaction rate with carbon dioxide among currently known alkanolamine absorbents and is relatively less expensive, and hence is widely used commercially. However, since monoethanolamine (MEA) forms a carbamate compound with high thermal stability when reacting with carbon dioxide, it not only requires a lot of energy for regeneration, but also has highly corrosiveness and severe deterioration. Diethanolamine (DEA), which is a secondary amine, has a lower vapor pressure than monoethanolamine, and thus shows less evaporation loss and less corrosive property, but it has a disadvantage in that consumption of regeneration energy is high. Methyl diethanolamine (MDEA), which is a tertiary amine, and 2-amino-2-methyl-1-propanol (AMP), which is a primary amine with high steric hindrance, form bicarbonate compounds that are regenerated more readily than carbamates when reacting with carbon dioxide. Due to such a characteristic, the regeneration rate is higher than that of MEA, but the reaction rate is rather slow, so a rate enhancer such as piperazine (PZ) may be used together as a way to increase the absorption rate (Japanese Patent Registration No. 3197173). However, the absorbent disclosed in this patent has a problem in that when piperazine is reacted with carbon dioxide, thermally more stable carbamate is formed in addition to bicarbonate compounds, such that a regeneration process is difficult to perform. In addition, piperazine (PZ), which is a secondary cyclic amine, has a fast absorption rate, but the problem of high regeneration energy still remains to be solved.

As a means to lower the regeneration energy, attempts have been made to replace an absorbent solvent with an organic solvent having a boiling point higher than the regeneration temperature of the absorbent and a low specific heat, instead of water having a high latent heat and specific heat. This is because, in the case of amine-based absorbents using water as a solvent, about 70% or more of consumed energy is used for regenerating the absorbent, and among them, 50% or more of the energy is known as energy required to vaporize water, that is, the energy attributed to the latent heat of water. Based on these findings, PCT Publication Nos. WO2012-034921 and WO2012-093853 disclose a carbon dioxide absorbent in which t-butylaminoethanol (TBAE) is used as a solvent. However, the absorbents disclosed in these patents have a severe disadvantage of heavy evaporation loss in the absorption and regeneration processes, because the absorption rate of carbon dioxide is significantly lower than that of MEA and they can only be effective in alcohols having a low boiling point such as methanol. Further, in the case of ethylene glycol (EG) solvent which is an alcohol having a high boiling point, the viscosity of a solution is excessively increased after the absorption of carbon dioxide, thereby imposing a restriction on the circulation of absorbent.

DETAILED DESCRIPTION OF THE INVENTION

Technical Problem

The present invention has been devised to solve the problems described above, and an object of the present invention is to provide a water-lean carbon dioxide absorbent with improved regeneration efficiency, wherein an absorbent comprising cyclodiamine, which shows an excellent reaction rate with carbon dioxide and is resistant to degradation due to oxygen and heat, is mixed with a solvent having low volatility and viscosity, thereby greatly reducing energy consumption due to latent heat of water when regenerated.

In addition, another object of the present invention is to provide a water-lean carbon dioxide absorbent which prevents the solidification phenomenon of cyclodiamine that occurs when only water is used as a solvent at room temperature, and thus enables easy production, transport, and storage of the absorbent.

The above and other objects and advantages of the present invention will become apparent from the following description of preferred embodiments.

Technical Solution

The above objects are achieved by a water-lean carbon dioxide absorbent comprising a cyclodiamine and a polyalkylene glycol alkyl ether.

Preferably, the cyclodiamine may be represented by chemical formula 1 below, and the polyalkylene glycol alkyl ether may include at least one selected from the group consisting of triethylene glycol monomethyl ether, triethylene glycol monoethyl ether, triethylene glycol monopropyl ether, triethylene glycol monobutyl ether tripropylene glycol monomethyl ether, tripropylene glycol monoethyl ether, tripropylene glycol monopropyl ether, tripropylene glycol monobutyl ether, tetraethylene glycol monomethyl ether, tetraethylene glycol monoethyl ether, tetraethylene glycol monopropyl ether, tetraethylene glycol monobutyl ether, tetrapropylene glycol monomethyl ether, tetrapropylene glycol monoethyl ether, tetrapropylene glycol monopropyl ether, and tetrapropylene glycol monobutyl ether:

(Chemical Formula 1)

In chemical formula 1, R1 is hydrogen, a C1-C4 alkyl group or aminoalkyl group, and R2, R3 and R4 are each independently hydrogen or a C1-C4 alkyl group, Preferably, the water-lean carbon dioxide absorbent further comprises an alkanolamine.

Preferably, the alkanolamine may be a tertiary dialkanolamine or a primary amine represented by chemical formula 3.

(Chemical Formula 3)

In chemical formula 3, R8 is a C1-C8 alkyl group or cycloalkyl group, and R9 is hydrogen or a C1-C8 alkyl group or cycloalkyl group.

Preferably, the water-lean carbon dioxide absorbent may contain 25 to 40% by weight of cyclodiamine.

Preferably, the water-lean carbon dioxide absorbent may contain 10 to 30% by weight of polyalkylene glycol alkyl ether based on the total amount of the absorbent.

Preferably, the water-lean carbon dioxide absorbent may contain 1 to 15% by weight of alkanolamine based on the total amount of the absorbent.

Preferably, the water-lean carbon dioxide absorbent may contain 55 to 75% by weight of the sum of the cyclodiamine, the polyalkylene glycol alkyl ethers and the alkanolamine, and a balance of water.

Preferably, the cyclodiamine represented by chemical formula 1 may include at least one selected from the group consisting of piperazine (PZ), 1-methylpiperazine (1-MPZ), 1-ethylpiperazine (1-EPZ), 1-propylpiperazine (1-PPZ), 1-isopropylpiperazine (1-IPPZ), 1-butylpiperazine (1-BPZ), 2-methylpiperazine (2-MPZ), 1,2-dimethylpiperazine (1,2-DMPZ), 1,5-dimethylpiperazine (1,5-DMPZ), 1,6-dimethylpiperazine (1,6-DMPZ), and N-(2-aminoethyl)piperazine (AEPZ).

Preferably, the polyalkylene glycol alkyl ether may include at least one selected from the group consisting of triethylene glycol monomethyl ether, triethylene glycol monoethyl ether, triethylene glycol monopropyl ether, triethylene glycol monobutyl ether, triethylene glycol dimethyl ether, triethylene glycol diethyl ether, triethylene glycol dipropyl ether, triethylene glycol dibutyl ether, triethylene glycol butyl methyl ether, tripropylene glycol monomethyl ether, tripropylene glycol monoethyl ether, tripropylene glycol monopropyl ether, tripropylene glycol monobutyl ether, tripropylene glycol dimethyl ether, tripropylene glycol diethyl ether, tripropylene glycol dipropyl ether, tripropylene glycol dibutyl ether, tetraethylene glycol monomethyl ether, tetraethylene glycol monoethyl ether, tetraethylene glycol monopropyl ether, tetraethylene glycol monobutyl ether, tetraethylene glycol dimethyl ether, tetraethylene glycol diethyl ether, tetraethylene glycol dipropyl ether, tetraethylene glycol dibutyl ether, tetrapropylene glycol monomethyl ether, tetrapropylene glycol monoethyl ether, tetrapropylene glycol monopropyl ether, tetrapropylene glycol monobutyl ether, tetrapropylene glycol dimethyl ether, tetrapropylene glycol diethyl ether, tetrapropylene glycol dipropyl ether, and tetrapropylene glycol dibutyl ether.

Preferably, the dialkanolamine represented by chemical formula 3 may include at least one selected from the group consisting of N-methyl diethanolamine, N-ethyl diethanolamine, N-propyl diethanolamine, N-isopropyl diethanolamine, N-butyl diethanolamine, N-t-butyl diethanolamine, N-sec-butyl diethanolamine, N-pentyl diethanolamine, N-2-pentyl diethanolamine, N-hexyl diethanolamine, N-2-hexyl diethanolamine, N-heptyl diethanolamine, N-2-heptyl diethanolamine, N-octyl diethanolamine, N-2-octyl diethanolamine, N-t-amyl diethanolamine, N-cyclopentyl diethanolamine, and N-cyclohexyl diethanolamine.

Also, the above object is achieved by a method for capturing carbon dioxide comprising a first step of absorbing carbon dioxide from a gas mixture containing carbon dioxide by using the carbon dioxide absorbent described above and a second step of separating the absorbed carbon dioxide from the carbon dioxide absorbent.

Preferably, the absorption temperature in the first step may be 35 to 45° C.

Preferably, the absorption pressure in the first step may be 1 to 30 atm.

Preferably, the separation temperature in the second step may be 95 to 150° C.

Preferably, the separation pressure in the second step may be 1 to 10 atm. Also, the object is achieved by a carbon dioxide capture device that uses the carbon dioxide absorbent described above.

Advantageous Effects

The water-lean carbon dioxide absorbent according to the present invention includes a polyalkylene glycol alkyl ether together with cyclodiamine, wherein the cyclodiamine is used as a main absorbent showing an excellent reaction rate and the polyalkylene glycol alkyl ether capable of improving regeneration energy is contained, so that the absorbent shows a fast reaction rate with carbon dioxide, is resistant to degradation due to oxygen and heat, and can greatly reduce energy consumption due to latent heat of water when regenerated, thereby improving regeneration efficiency.

Also, the water-lean carbon dioxide absorbent according to the present invention prevents corrosion and a solidification phenomenon at room temperature through polyalkylene glycol alkyl ether, and alkanolamine is added thereto to reduce a solidification phenomenon at room temperature due to the composition of the cyclodiamine and the polyalkylene glycol alkyl ether, thus enabling ease of production, transfer, and management of the absorbent.

However, the effects of the present invention are not limited to the effects mentioned above, and other effects not mentioned will be clearly understood by those skilled in the art from the description below.

MODE FOR INVENTION

Hereinafter, embodiments of the present invention will be described in detail with reference to the accompanying drawings so as to be easily practiced by a person of ordinary skill in the art. This invention may, however, be embodied in many different forms and should not be construed as limited to only the embodiments set forth herein.

In the drawings, the thickness of layers and regions are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of the invention, suitable methods and materials are described herein.

A water-lean carbon dioxide absorbent according to an embodiment of the present invention includes a cyclodiamine and a polyalkylene glycol alkyl ether. The carbon dioxide absorbent of the present invention uses the cyclodiamine showing an excellent reaction rate as a main absorbent. An existing typical absorbent utilizing cyclodiamine is 5M piperazine, and in this case, the water content is high and regeneration energy is high due to high latent heat of water when the absorbent is regenerated. In order to minimize the water content, regeneration energy is reduced by mixing polyalkylene glycol alkyl ether.

In the water-lean carbon dioxide absorbent according to an embodiment of the present invention, cyclodiamine is represented by chemical formula 1 below.

(Chemical Formula 1)

In chemical formula 1, R1 is hydrogen, a C1-C4 alkyl group or aminoalkyl group, and R2, R3 and R4 are each independently hydrogen or a C1-C4 alkyl group.

In the present invention, the cyclodiamine represented by chemical formula 1 preferably includes at least one selected from the group consisting of piperazine (PZ), 1-methylpiperazine (1-MPZ), 1-ethylpiperazine (1-EPZ), 1-propylpiperazine (1-PPZ), 1-isopropylpiperazine (1-IPPZ), 1-butylpiperazine (1-BPZ), 2-methylpiperazine (2-MPZ), 1,2-dimethylpiperazine (1,2-DMPZ), 1,5-dimethylpiperazine (1,5-DMPZ), 1,6-dimethylpiperazine (1,6-DMPZ), N-(2-aminoethyl)piperazine (AEPZ), and the like.

In the present invention, the cyclodiamine minimizes the water content in the absorbent to reduce regeneration energy and is a basic substance that prevents corrosion of the absorbent which is highly corrosive.

In the water-lean carbon dioxide absorbent according to an embodiment of the present invention, the polyalkylene glycol alkyl ether is represented by chemical formula 2 below.

In the present invention, the polyalkylene glycol alkyl ether preferably includes at least one selected from the group consisting of triethylene glycol monomethyl ether, triethylene glycol monoethyl ether, triethylene glycol monopropyl ether, triethylene glycol monobutyl ether, triethylene glycol dimethyl ether, triethylene glycol diethyl ether, triethylene glycol dipropyl ether, triethylene glycol dibutyl ether, triethylene glycol butyl methyl ether, tripropylene glycol monomethyl ether, tripropylene glycol monoethyl ether, tripropylene glycol monopropyl ether, tripropylene glycol monobutyl ether, tripropylene glycol dimethyl ether, tripropylene glycol diethyl ether, tripropylene glycol dipropyl ether, tripropylene glycol dibutyl ether, tetraethylene glycol monomethyl ether, tetraethylene glycol monoethyl ether, tetraethylene glycol monopropyl ether, tetraethylene glycol monobutyl ether, tetraethylene glycol dimethyl ether, tetraethylene glycol diethyl ether, tetraethylene glycol dipropyl ether, tetraethylene glycol dibutyl ether, tetrapropylene glycol monomethyl ether, tetrapropylene glycol monoethyl ether, tetrapropylene glycol monopropyl ether, tetrapropylene glycol monobutyl ether, tetrapropylene glycol dimethyl ether, tetrapropylene glycol diethyl ether, tetrapropylene glycol dipropyl ether, tetrapropylene glycol dibutyl ether, and the like.

The polyalkylene glycol alkyl ether prevents corrosion of cyclodiamine and solidification at room temperature.

Also, the water-lean carbon dioxide absorbent according to an embodiment of the present invention may further include an alkanolamine together with the aforementioned cyclodiamine and polyalkylene glycol alkyl ether.

In this time, it is preferable to use, as the alkanolamine, monoethanolamine (MEA), which is a primary amine, or a tertiary dialkanolamine. It is more preferable to use a tertiary dialkanolamine as the alkanolamine, and it is even more preferable to use methyl diethanolamine (MDEA) as the tertiary dialkanolamine.

The tertiary dialkanolamine reduces a solidification phenomenon at room temperature due to the composition of the cyclodiamine and the polyalkylene glycol alkyl ether, thus improving ease of production, transfer, and management of the absorbent.

In the water-lean carbon dioxide absorbent according to an embodiment of the present invention, the tertiary dialkanolamine is represented by chemical formula 3 below.

(Chemical Formula 3)

In chemical formula 3, R8 is a C1-C8 alkyl group or cycloalkyl group, and R9 is hydrogen or a C1-C8 alkyl group or cycloalkyl group.

In the present invention, the dialkanolamine represented by chemical formula 3 preferably includes at least one selected from the group consisting of N-methyl diethanolamine, N-ethyl diethanolamine, N-propyl diethanolamine, N-isopropyl diethanolamine, N-butyl diethanolamine, N-t-butyl diethanolamine, N-sec-butyl diethanolamine, N-pentyl diethanolamine, N-2-pentyl diethanolamine, N-hexyl diethanolamine, N-2-hexyl diethanolamine, N-heptyl diethanolamine, N-2-heptyl diethanolamine, N-octyl diethanolamine, N-2-octyl diethanolamine, N-t-amyl diethanolamine, N-cyclopentyl diethanolamine, N-cyclohexyl diethanolamine, and the like.

The water-lean carbon dioxide absorbent according to an embodiment of the present invention preferably contains 25 to 40% by weight of cyclodiamine based on the total amount of the absorbent. If the amount of cyclodiamine is less than 25% by weight, the amount of reactant is small and high regeneration energy is required, and if the amount exceeds 40% by weight, there is a serious problem of precipitation of the cyclodiamine after capturing carbon dioxide.

It is preferable to contain 10 to 30% by weight of polyalkylene glycol alkyl ether based on the total amount of the water-lean carbon dioxide absorbent according to an embodiment of the present invention. If the amount of polyalkylene glycol alkyl ether is less than 10% by weight, the actual reduction in latent heat of the absorbent is not great, and if the amount exceeds 30% by weight, a severe precipitation phenomenon occurs when carbon dioxide is captured at a high concentration, resulting in problems in the operation of the capture process.

In addition, in the case where the water-lean carbon dioxide absorbent according to an embodiment of the present invention includes an alkanolamine, it is preferable to contain 1 to 15% by weight of alkanolamine based on the total amount of the absorbent. If the amount of alkanolamine is less than 1% by weight, the effect of suppressing the solidification phenomenon by the alkanolamine is insignificant. If the amount exceeds 15% by weight, the alkanolamine is involved in carbon dioxide capture like the cyclodiamine, and during this process, it may help the absorption reaction of carbon dioxide, but increase the severe generation of degraded substances and corrosion due to the durability issue of the alkanolamine, and a serious foaming phenomenon occurs in the carbon dioxide absorption reaction, and thus its use as a practical absorbent is inevitably limited.

In addition, the water-lean carbon dioxide absorbent according to an embodiment of the present invention preferably contains 55 to 75% by weight of the sum of the cyclodiamine, the polyalkylene glycol alkyl ethers and the alkanolamine, and a balance of water. If the sum exceeds 75% by weight, when the concentration of cyclodiamine, polyalkylene glycol alkyl ether, and alkanolamine increases, the absorbent becomes highly viscous as it captures carbon dioxide, and precipitation of cyclodiamine occurs, which may cause serious problems in the operation of the process. If the sum is less than 55% by weight, the carbon dioxide capture efficiency is reduced.

A method for capturing carbon dioxide using a water-lean carbon dioxide absorbent according to an embodiment of the present invention includes a first step of absorbing carbon dioxide from a gas mixture containing carbon dioxide using the above-described water-lean carbon dioxide absorbent and a second step of separating the absorbed carbon dioxide from the carbon dioxide absorbent.

In the first step, an absorption temperature is preferably 35 to 45° C., and an absorption pressure is preferably normal pressure to 30 atm.

In the first step, if the absorption temperature is more than 45° C., separation of carbon dioxide is performed at the same time as the absorption such that the amount of carbon dioxide absorption is reduced, whereas if the absorption temperature is less than 35° C., additional refrigeration equipment is required to lower the temperature, thereby causing economic inefficiency.

Further, an exhaust gas has normal pressure, such that it is most economical to perform absorption at normal pressure (1 atm). If an absorption pressure is above 30 atm, although an absorption amount is greatly increased, additional equipment, i.e., a compressor, is needed to increase the pressure, thereby resulting in economic inefficiency.

In the second step, a separation temperature is preferably 95 to 150° C., and a separation pressure is preferably normal pressure to 10 atm.

In the second step, if the separation temperature is less than 95° C., separation of carbon dioxide is not sufficiently performed, whereas if the separation temperature is more than 150° C., thermal degradation of amines and ethers at high temperature becomes severe. In order to separate carbon dioxide at a pressure of 10 atm or more, the separation needs to be performed at a temperature greater than 150° C. due to a high carbon dioxide partial pressure, such that the same problems as in the separation at high temperature arise. Therefore, the separation is preferably performed at normal pressure to 10 atm.

Among the above terms, the term "normal pressure" refers to atmospheric pressure, i.e., 1 atm.

In addition, the present invention includes a carbon dioxide capture device using the water-lean carbon dioxide absorbent described above. The carbon dioxide capture device according to an embodiment of the present invention may suppress generation of carbon dioxide by absorbing carbon dioxide from an exhaust gas through the aforementioned method for capturing carbon dioxide.

Hereinafter, the present invention will be described in further detail with reference to Examples. The following Examples are provided to illustrate further the present disclosure and are not intended to limit the scope of the present invention.

EXAMPLES

Example 1

Piperazine (CAS No. 142-63-2) was used as a cyclodiamine, triethylene glycol monomethyl ether (TEGMME, CAS No. 112-35-6) was used as a polyalkylene glycol alkyl ether, and they were mixed together with a balance of water at a weight ratio shown in Table 1 below to prepare a carbon dioxide absorbent.

Example 2

A carbon dioxide absorbent was prepared in the same manner as in Example 1 except that 5% by weight of methyl diethanolamine (MDEA, CAS No. 105-59-9) was used as shown in Table 1 in order to prevent solidification.

Example 3

As shown in Table 1, a carbon dioxide absorbent was prepared in the same manner as in Example 2 except that 10% by weight of methyl diethanolamine (MDEA) was used.

Example 4

As shown in Table 1, a carbon dioxide absorbent was prepared in the same manner as in Example 2 except that 15% by weight of methyl diethanolamine (MDEA) was used.

Example 5

As shown in Table 1, a carbon dioxide absorbent was prepared in the same manner as in Example 1 except that the amount of piperazine was 40% by weight and the amount of triethylene glycol monomethyl ether was 20% by weight.

Example 6

A carbon dioxide absorbent was prepared in the same manner as in Example 1 except that 5% by weight of monoethanolamine (MEA, CAS No. 141-43-5) was used as shown in Table 1 in order to prevent solidification.

Example 7

As shown in Table 1, a carbon dioxide absorbent was prepared in the same manner as in Example 6 except that 10% by weight of monoethanolamine (MEA) was used.

Example 8

As shown in Table 1, a carbon dioxide absorbent was prepared in the same manner as in Example 6 except that 15% by weight of monoethanolamine (MEA) was used.

Example 9

As shown in Table 1, 30% by weight of piperazine, 25% by weight of triethylene glycol monomethyl ether (TEGMME), and 15% by weight of monoethanolamine (MEA) were used to prepare a carbon dioxide absorbent.

Example 10

As shown in Table 1, a carbon dioxide absorbent was prepared in the same manner as in Example 1 except that 25% by weight of piperazine was used and 30% by weight of triethylene glycol monomethyl ether (TEGMME) was used.

Comparative Examples

Comparative Example 1

A carbon dioxide absorbent was prepared using 30% by weight of monoethanolamine (MEA) and a balance of water as shown in Table 1.

Comparative Example 2

A carbon dioxide absorbent was prepared using 30% by weight of piperazine and a balance of water as shown in Table 1.

Comparative Example 3

As shown in Table 1, a carbon dioxide absorbent was prepared in the same manner as in Example 1 except that 40% by weight of triethylene glycol monomethyl ether (TEGMME) was used.

Comparative Example 4

As shown in Table 1, a carbon dioxide absorbent was prepared in the same manner as in Example 1 except that 50% by weight of triethylene glycol monomethyl ether (TEGMME) was used.

Comparative Example 5

As shown in Table 1, a carbon dioxide absorbent was prepared in the same manner as in Example 2 except that 20% by weight of methyl diethanolamine (MDEA) was used.

Comparative Example 6

As shown in Table 1, a carbon dioxide absorbent was prepared in the same manner as in Example 1 except that 40% by weight of piperazine was used and 25% by weight of triethylene glycol monomethyl ether (TEGMME) was used.

Comparative Example 7

As shown in Table 1, a carbon dioxide absorbent was prepared in the same manner as in Example 1 except that 45% by weight of piperazine was used and 20% by weight of triethylene glycol monomethyl ether (TEGMME) was used.

Comparative Example 8

As shown in Table 1, a carbon dioxide absorbent was prepared in the same manner as in Example 1 except that 20% by weight of piperazine was used and 30% by weight of triethylene glycol monomethyl ether (TEGMME) was used.

Figure 1:
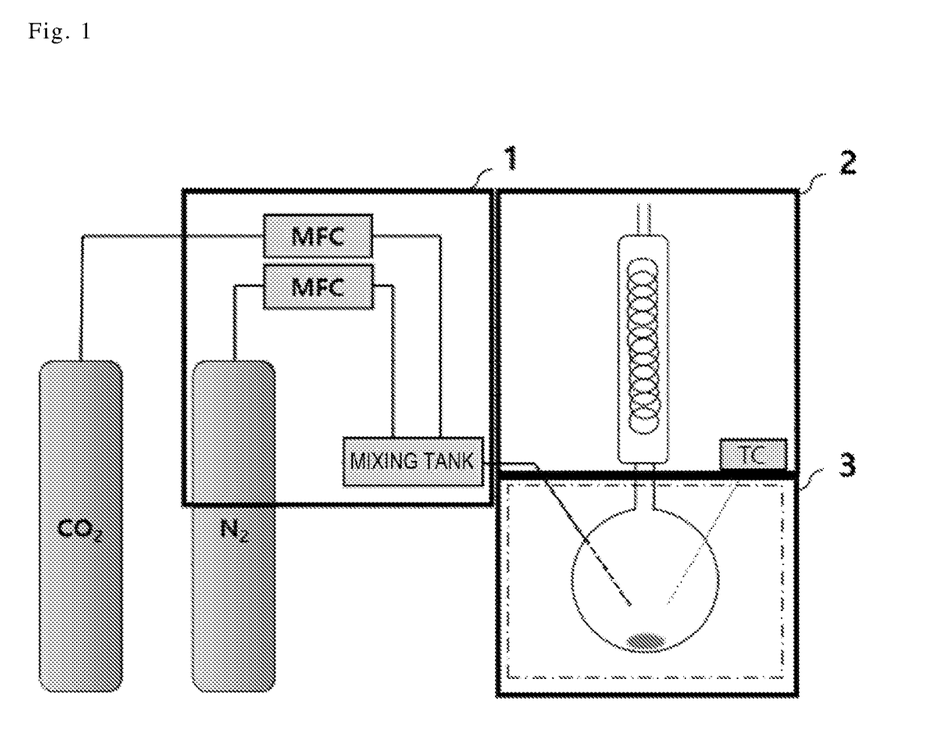
FIG. 1 is a schematic view illustrating a batch-type carbon dioxide reactor.

The batch-type carbon dioxide reaction device illustrated in FIG. 1 mainly includes a gas controller 1, a reactor 2, and a condenser 3. The gas controller 1 consists of a carbon dioxide mass flow controller (MFC), a nitrogen MFC, and a mixing tank, generates a carbon dioxide mixture gas at a constant flow rate and concentration and injects the same into the reactor 2. The reactor 2 is equipped with a stirrer therein to allow an absorbent to be well mixed into a round bottom flask made of a glassware material in a thermostat. In order to prevent the concentration of the carbon dioxide absorbent from changing due to volatilization of water when the gas is discharged after the reaction, the condenser 3 is installed to prevent water loss.

In the test, 50 ml of carbon dioxide absorbent was injected into the reactor 2 and an exhaust gas was injected at a rate of 200 ml/min and a carbon dioxide concentration of 4 vol %. The amount of carbon dioxide absorbed by the absorbent was quantitatively measured through a total organic carbon (TOC) analyzer by sampling the absorbent.

In this test, it was confirmed whether the absorbent was operable in the actual process through the phenomenon

TABLE 1

| | Piperazine | TEGMME | MEA | MDEA | Water | Evaluation items |
|---|---|---|---|---|---|---|
| Example 1 | 30 | 30 | | | 40 | Carbon dioxide reactor, continuous cycle device evaluation, corrosion, and solidification phenomenon evaluation |
| Example 2 | 30 | 30 | | 5 | 35 | continuous cycle device evaluation, solidification phenomenon evaluation |
| Example 3 | 30 | 30 | | 10 | 30 | solidification phenomenon evaluation |
| Example 4 | 30 | 30 | | 15 | 25 | solidification phenomenon evaluation |
| Example 5 | 40 | 20 | | | 40 | Carbon dioxide reactor |
| Example 6 | 30 | 30 | 5 | | 35 | solidification phenomenon evaluation |
| Example 7 | 30 | 30 | 10 | | 30 | solidification phenomenon evaluation |
| Example 8 | 30 | 30 | 15 | | 25 | solidification phenomenon evaluation |
| Example 9 | 30 | 25 | 15 | | 30 | Carbon dioxide reactor continuous cycle device evaluation |
| Example 10 | 25 | 30 | | | 45 | continuous cycle device evaluation |
| Comparative Example 1 | | 30 | | | 70 | continuous cycle device evaluation (device base line evaluation) |
| Comparative Example 2 | 30 | | | | 70 | Carbon dioxide reactor, continuous cycle device evaluation, corrosion, and solidification evaluation |
| Comparative Example 3 | 30 | 40 | | | 30 | Carbon dioxide reactor |
| Comparative Example 4 | 30 | 50 | | | 20 | Carbon dioxide reactor |
| Comparative Example 5 | 30 | 30 | | 20 | 20 | Carbon dioxide reactor |
| Comparative Example 6 | 40 | 25 | | | 30 | Carbon dioxide reactor |
| Comparative Example 7 | 45 | 20 | | | 30 | Carbon dioxide reactor |
| Comparative Example 8 | 20 | 30 | | | 50 | continuous cycle device evaluation |

1. Carbon Dioxide Reactor

A test was conducted by using a batch-type carbon dioxide reaction device illustrated in FIG. 1 to identify the absorption capacity and characteristics of a carbon dioxide absorbent under the conditions of absorption tower. FIG. 1 is a schematic view illustrating a batch-type carbon dioxide reactor.

occurring during the absorption reaction of Examples and Comparative Examples, rather than through the amount of carbon dioxide absorption. The test temperature was maintained at 40° C. until the carbon dioxide absorbent sufficiently reacted with carbon dioxide to reach phase equilibrium, and a precipitation phenomenon of the carbon dioxide absorbent was observed.

Here, a case where precipitation occurred is indicated as O, and a case where precipitation did not occur is indicated as X.

Referring to Table 2, a precipitation phenomenon occurred in all of Comparative Example 3 in which 40% by weight of triethylene glycol monomethyl ether was used, and Comparative Example 4 in which 50% by weight of triethylene glycol monomethyl ether was used, excluding Example 1 in which the amount of piperazine was 30% by weight and the amount of triethylene glycol monomethyl ether was 30% by weight.

In addition, when the amount of piperazine was greater than or equal to 40% by weight, only up to 20% by weight of triethylene glycol monomethyl ether (Example 5), no precipitation phenomenon was observed, and when the amount of triethylene glycol monomethyl ether was 25% by weight (Comparative Example 6), a serious precipitation phenomenon occurred. At this time, even when the amount of triethylene glycol monomethyl ether was lowered to 20% by weight and the amount of piperazine was 45% by weight, a precipitation phenomenon occurred (Comparative Example 7).

TABLE 2

| Example 1 | Example 5 | Example 9 | Comparative Example 3 |
|---|---|---|---|
| X | X | X | O |
| Comparative Example 4 | Comparative Example 5 | Comparative Example 6 | Comparative Example 7 |
| O | O | O | O |

2. Continuous Cycle Device Evaluation (Regeneration Energy Evaluation)

Figure 2A:
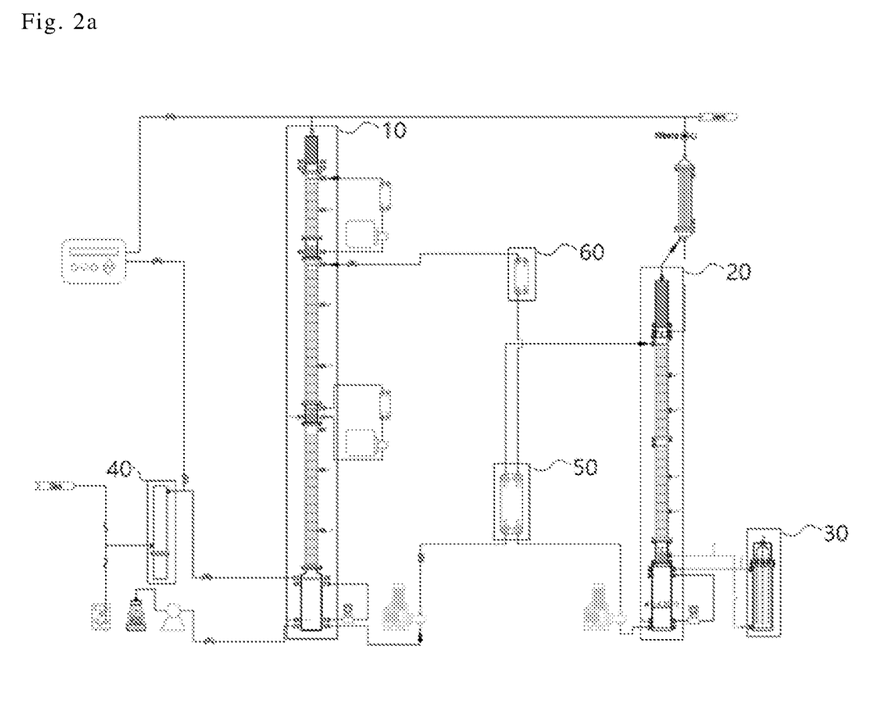
FIG. 2a is a schematic view illustrating a laboratory scale carbon dioxide absorption and regeneration continuous cycle device.

In order to make actual measurement of regeneration energy for Examples 1, 2, and 9, and Comparative Examples 1 and 2, a device of the same type as used in the actual capture process was built and a test was conducted. FIG. 2a is a schematic view illustrating a laboratory scale carbon dioxide absorption and regeneration continuous cycle device.

The device illustrated in FIG. 2a consists of an absorption tower 10 and a regeneration tower 20, as in a general carbon dioxide capture process. Thermal energy of a reboiler 30 is supplied through electricity, and regeneration energy is measured by measuring the electricity used in the reboiler 30 through a precision integrating wattmeter.

An injected gas was a mixture of 14.8 vol % of carbon dioxide and air and supplied at 7.4 vol % by boiling water in the same condition as the actual exhaust gas condition. The temperature of the exhaust gas supplied was maintained constantly at 40° C. through an exhaust gas heater 40.

An R/L heat exchanger 50 is installed between the absorption tower 10 and the regeneration tower 20 to allow sufficient heat recovery, a $CO_2$ lean loading heat exchanger 60 is installed to control the temperature of the absorbent supplied to the absorption tower 10.

The test was conducted by supplying a constant quantity of exhaust gas at a flow rate of 3 Nm3/h and measuring the regeneration energy of Examples and Comparative Examples at a steady state while changing the flow rate of the absorbent under the condition of a $CO_2$ recovery rate of approximately 90%. The standard for steady state was determined when the temperature, pressure, and an $CO_2$ emission concentration of the entire device did not change for more than 1 hour, and regeneration energy was derived using the electricity used for last 30 minutes.

Figure 2B:
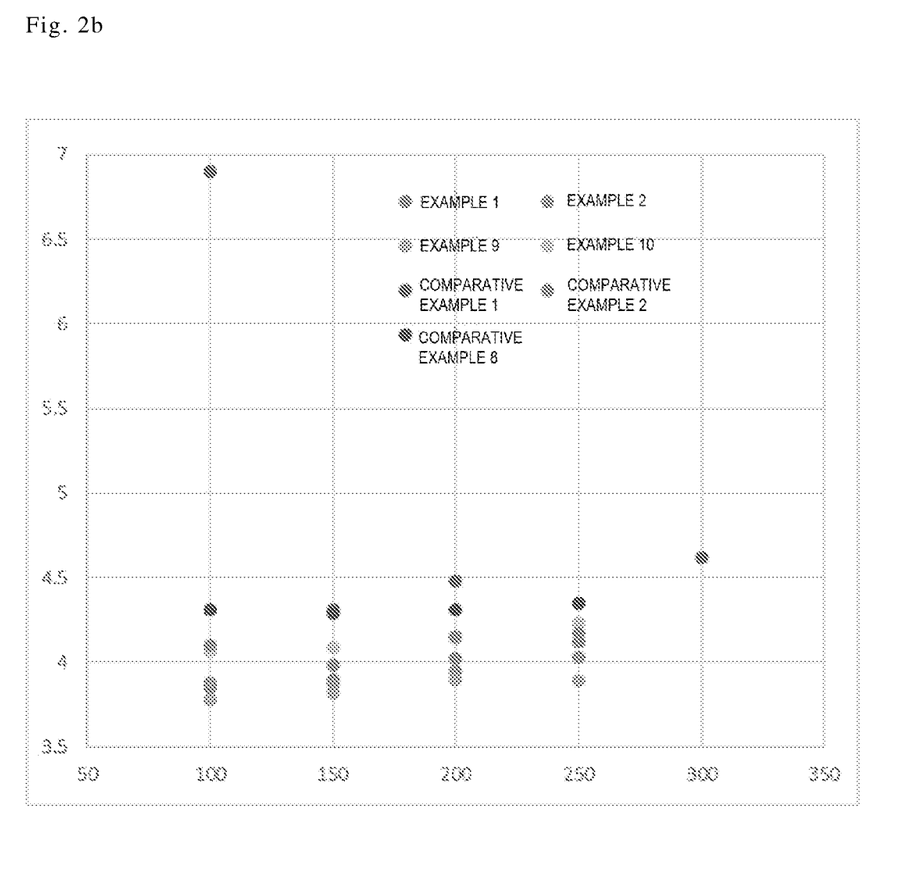
FIG. 2b is a diagram showing the regeneration energy at each absorbent circulation flow rate of Examples and Comparative Examples.

The operation results at each absorbent circulation flow rate of Examples 1, 2, 9, and 10 and Comparative Examples 1, 2, and 8 are shown in Table 3 and FIG. 2b. The amount of piperazine in Examples 1, 2, and 9 and Comparative Example 2 was the same, which was 30% by weight, but when compared to Comparative Example 2 at the same circulation flow rate of the carbon dioxide absorbents, all the Examples showed low regeneration energy at the same circulation flow rate of the absorbents, and thus it can be seen that energy efficiency was high.

Also, a test on Comparative Example 1 was conducted for a baseline evaluation of the performance of the laboratory-scale carbon dioxide absorption and regeneration continuous cycle device, and Comparative Example 1 showed a regeneration energy pattern similar to that of the conventional process such that it was confirmed that the energy efficiency was relatively low since the circulation flow rate was higher than that of Examples.

TABLE 3

| | Absorbent circulation flow rate (ml/min) | | | | |
|---|---|---|---|---|---|
| | 100 | 150 | 200 | 250 | 300 |
| Example 1 | 3.85 | 3.9 | 4.02 | 4.12 | |
| Example 2 | 3.88 | 3.87 | 3.95 | 4.03 | |
| Example 9 | 3.78 | 3.82 | 3.90 | 3.89 | |
| Example 10 | 4.07 | 4.09 | 4.14 | 4.23 | |
| Comparative Example 1 | 6.9 | 4.31 | 4.48 | | 4.62 |
| Comparative Example 2 | 4.1 | 3.98 | 4.15 | 4.17 | |
| Comparative Example 8 | 4.31 | 4.29 | 4.31 | 4.35 | |

3. Corrosion Evaluation

For a corrosion evaluation, metal specimens (carbon steel) were placed in the absorbents prepared in Example 1 and Comparative Example 2 and exposed to an oven at a temperature of 80° C. for a long time such that the degree of surface corrosion was recorded with a photograph and the weight was measured to confirm the degree of corrosion through weight change due to corrosion.

Figure 3A:
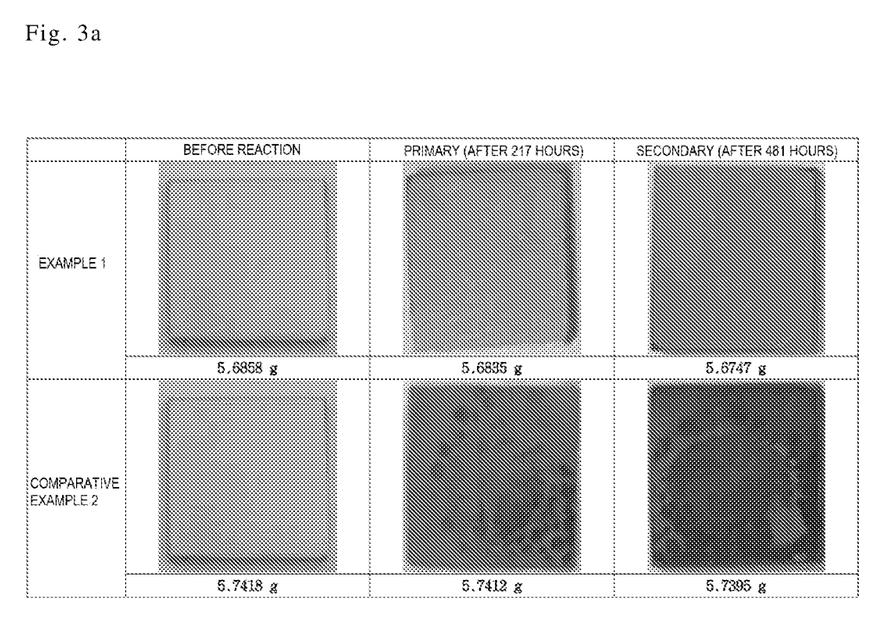
FIG. 3a shows photographs of a corrosion test result for Example 1 and Comparative Example 2.
Figure 3B:
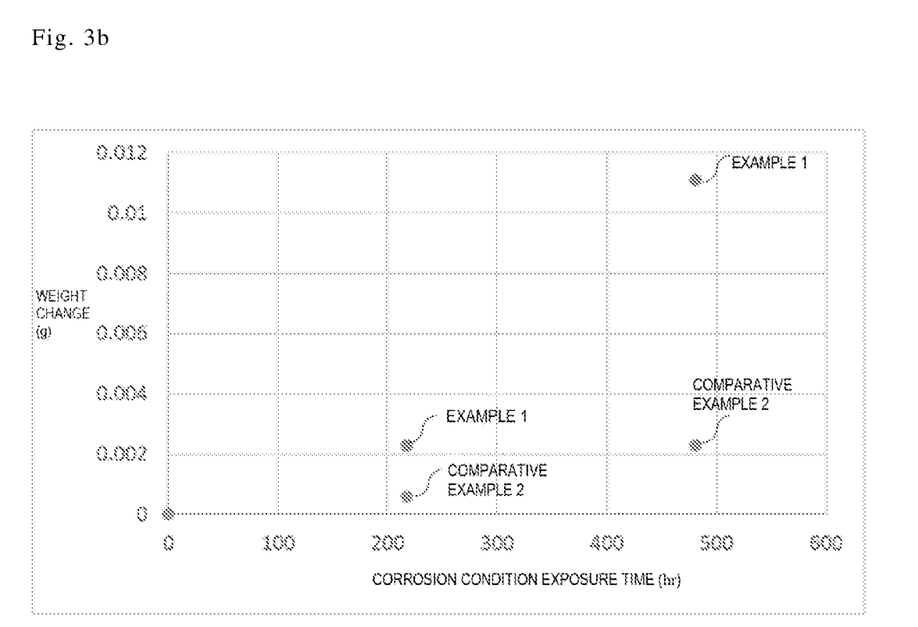
FIG. 3b is a diagram showing weight changes according to the corrosion test result for Example 1 and Comparative Example 2.

When comparing Example 1 and Comparative Example 2, the difference in the degree of corrosion can be clearly visually confirmed from FIG. 3a, and from FIG. 3b which compares the weight change of specimens, it is confirmed that there was a corrosion difference of 5 times or more when a secondary exposure time of 481 hours had elapsed.

4. Solidification Phenomenon Test

In the case of piperazine, which is most commonly used as a carbon dioxide absorbent among cyclodiamines, solidification occurs due to physical impact at room temperature (25° C.) at 30% by weight of a piperazine content. A test on the solidification phenomenon was conducted such that the absorbents prepared in Examples 1, 2, 4, and 5 and Comparative Example 2 were exposed to a thermostat at a temperature of 25° C. and a solidification phenomenon was observed while lowering the temperature. Here, a case where solidification occurred is indicated as O, and a case where precipitation did not occur is indicated as X.

TABLE 4

| Items | 25° C. | 20° C. | 15° C. | 10° C. | 5° C. |
|---|---|---|---|---|---|
| Example 1 | X | X | X | O | O |
| Example 2 | X | X | X | X | O |
| Example 4 | X | X | X | X | O |
| Example 5 | X | X | X | X | X |
| Comparative Example 2 | X | O | O | O | O |

Referring to Table 4, in the case of Comparative Example 2, solidification occurred at a temperature of 20° C., and in the case of Example 1, solidification occurred at a temperature of 10° C. In the case of Examples 2 and 4, it was confirmed that the solidified material floated at a temperature of 5° C. In addition, in Example 5, solidification did not occur even at a temperature of 5° C. As such, the carbon dioxide absorbent of the present invention has a relatively low temperature at which a solidification phenomenon begins, whereas Comparative Example 2 shows that solidification begins at a temperature close to the room temperature of 25° C.

As described above, it can be seen that Examples 1 to 9 satisfying the configuration of the present invention all showed excellent performance in the test results.

On the other hand, it can be seen that Comparative Examples 6 and 7 having excessive alkanolamine content are not suitable for use as carbon dioxide absorbents due to precipitation.

It can be seen that Comparative Example 8 with insufficient cyclodiamine content had high regeneration energy, showing the performance similar to that of commercial absorbents, which are Comparative Examples 1 and 2, and thus the carbon dioxide absorbent had a problem in terms of energy efficiency.

It can be seen that the carbon dioxide absorbents prepared in Comparative Examples 6 and 7 with excessive cyclodiamine content had a problem of precipitation in the process of absorbing carbon dioxide.

It can be seen that in Comparative Examples 3 and 4 with excessive polyalkylene glycol alkyl ether content, phase separation and precipitation occurred in the process of absorbing carbon dioxide, resulting in problems in process operation.

While the invention has been shown and described with reference to certain exemplary embodiments thereof, the invention should not be construed as being limited to the embodiments set forth herein, and various changes in form and details may be made therein by those of ordinary skill in the art without departing from the spirit and scope of the present invention.

The invention claimed is:

1. A water-lean carbon dioxide absorbent comprising a cyclodiamine, a polyalkylene glycol monoalkyl ether, alkanolamine, and water,
   wherein the cyclodiamine is represented by chemical formula 1 below,
   wherein the alkanolamine comprises a tertiary dialkanolamine represented by chemical formula 3 below or monoethanolamine (MEA), which is a primary amine,
   wherein solidification does not occur at a temperature of 15 to 20° C.:

(Chemical Formula 1)

where R1 is hydrogen, a C1-C4 alkyl group or aminoalkyl group, and R2, R3 and R4 are each independently hydrogen or a C1-C4 alkyl group, (Chemical Formula 3)

where R8 is a C1-C8 alkyl group or cycloalkyl group, and R9 is hydrogen or a C1-C8 alkyl group or cycloalkyl group,
   wherein the water-lean carbon dioxide absorbent contains 25 to 40% by weight of cyclodiamine, 10 to 30% by weight of polyalkylene glycol alkyl ether and 1 to 15% by weight of alkanolamine based on the total amount of the absorbent,
   wherein the sum amount of the cyclodiamine, the polyalkylene glycol alkyl ethers and the alkanolamine in the water-lean carbon dioxide absorbent is 55 to 75% by weight, and
   wherein the polyalkylene glycol monoalkyl ether comprises at least one selected from the group consisting of triethylene glycol monomethyl ether, triethylene glycol monoethyl ether, triethylene glycol monopropyl ether, triethylene glycol monobutyl ether, tripropylene glycol monomethyl ether, tripropylene glycol monoethyl ether, tripropylene glycol monopropyl ether, tripropylene glycol monobutyl ether, tetraethylene glycol monomethyl ether, tetraethylene glycol monoethyl ether, tetraethylene glycol monopropyl ether, tetraethylene glycol monobutyl ether, tetrapropylene glycol monomethyl ether, tetrapropylene glycol monoethyl ether, tetrapropylene glycol monopropyl ether, and tetrapropylene glycol monobutyl ether.

2. The water-lean carbon dioxide absorbent of claim 1, wherein the cyclodiamine represented by chemical formula 1 comprises at least one selected from the group consisting of piperazine (PZ), 1-methylpiperazine (1-MPZ), 1-ethylpiperazine (1-EPZ), 1-propylpiperazine (1-PPZ), 1-isopropylpiperazine (1-IPPZ), 1-butylpiperazine (1-BPZ), 2-methylpiperazine (2-MPZ), 1,2-dimethylpiperazine (1,2-DMPZ), 1,5-dimethylpiperazine (1,5-DMPZ), 1,6-dimethylpiperazine (1,6-DMPZ), and N-(2-aminoethyl) piperazine (AEPZ).

3. The water-lean carbon dioxide absorbent of claim 1, wherein the dialkanolamine represented by chemical formula 3 comprises at least one selected from the group consisting of N-methyl diethanolamine, N-ethyl diethanolamine, N-propyl diethanolamine, N-isopropyl diethanolamine, N-butyl diethanolamine, N-t-butyl diethanolamine, N-sec-butyl diethanolamine, N-pentyl diethanolamine, N-2-pentyl diethanolamine, N-hexyl diethanolamine, N-2-hexyl diethanolamine, N-heptyl diethanolamine, N-2-heptyl diethanolamine, N-octyl diethanolamine, N-2-octyl diethanolamine, N-t-amyl diethanolamine, N-cyclopentyl diethanolamine, and N-cyclohexyl diethanolamine.

\* \* \* \* \*